(12) United States Patent
Higaki et al.

(10) Patent No.: US 6,231,706 B1
(45) Date of Patent: May 15, 2001

(54) METHOD AND APPARATUS FOR MANUFACTURING OPTICAL DISK

(75) Inventors: Norihide Higaki, Ibaraki; Keinosuke Kanashima, Osaka; Katsuhiro Kida, Suita; Hideki Tsutsumi, Katano, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/230,569

(22) PCT Filed: May 29, 1998

(86) PCT No.: PCT/JP98/02381

§ 371 Date: Jan. 28, 1999

§ 102(e) Date: Jan. 28, 1999

(87) PCT Pub. No.: WO98/54708

PCT Pub. Date: Dec. 3, 1998

(30) Foreign Application Priority Data

May 30, 1997 (JP) .................................... 9-141958

(51) Int. Cl.$^7$ .................................... B32B 31/20
(52) U.S. Cl. .................... 156/74; 156/295; 156/556; 156/566; 156/571
(58) Field of Search .................... 156/538, 539, 156/556, 563, 566, 571, 291, 295, 391, 74; 264/262; 425/110, 123, 124, 125, 126.1, 129.1

(56) References Cited

U.S. PATENT DOCUMENTS 5,240,548 * 8/1993 Aramaki et al. ..................... 156/566
5,612,068 3/1997 Kempf et al. .

FOREIGN PATENT DOCUMENTS

| 40 41 199 | 7/1992 | (DE) . |
| 44 08 537 | 9/1995 | (DE) . |
| 0 744 739 | 11/1996 | (EP) . |
| 0 793 224 | 9/1997 | (EP) . |
| 5-20714 * | 1/1993 | (JP) . |
| 97/35720 | 10/1997 | (WO) . |

* cited by examiner

Primary Examiner—Jeff H. Aftergut
Assistant Examiner—John T. Haran
(74) Attorney, Agent, or Firm—Wenderoth, Lind & Ponack, L.L.P.

(57) ABSTRACT

Substrates to be paired are alternately aligned. One substrate of a pair of substrates adjacent to each other is turned over thereby to face the other substrate, and the substrates held in a state facing each other are sent to a bonding position. An adhesive is supplied annularly into an interval of the substrates, and the substrates are rotated in a planar direction to thereby narrow the interval and eventually spread the adhesive in a radial direction to form an adhesive layer. The lower substrate is supported from below and carried from the bonding position to a setting position, and the adhesive layer is set, whereby an optical disk is obtained. The optical disk is taken out from the setting position.

29 Claims, 11 Drawing Sheets

METHOD AND APPARATUS FOR MANUFACTURING OPTICAL DISK

TECHNICAL FIELD

The present invention relates to a method and an apparatus for manufacturing optical disks and more particularly, to a method for manufacturing optical disks of a bonded type to be utilized for DVDs, etc. and an apparatus used in the method.

BACKGROUND ART

There is a known technique to obtain optical disks for DVD by bonding a plurality of substrates having recording layers to each other thereby to achieve multilayer recording The Applicant has proposed a method and an apparatus for bonding of optical disks in a technique described in the International Publication No. WO 97/35720.

In the disclosed technique, a pair of substrates are held to confront each other via a relatively narrow interval. An adhesive discharge nozzle is inserted into the interval of the substrates. While the adhesive is injected out through the discharge nozzle, the pair of substrates are rotated in a planar direction (rotated around a center axis of the substrates) to thereby arrange the adhesive annularly in the interval. The interval of the substrates is reduced then and at the same time, the substrates are further rotated. In consequence, the annularly injected adhesive is spread in a radial direction to thereby fill the interval with a thin adhesive layer. The pair of substrates is bonded via the adhesive layer when the adhesive layer is set through the projection of ultraviolet rays. An optical disk is obtained in this manner.

According to the above-discussed method, the adhesive arranged annularly in the interval of the substrates is expanded in the radial direction while being kept in contact with the substrates, so that the thin adhesive layer of a correct thickness can be formed efficiently. Moreover, the method is advantageous in that air bubbles or gaps are difficult to bring about between the adhesive layer and the substrate, excessive use of the adhesive is eliminated, etc.

However, the above method has disadvantages as well. Specifically, the method needs the arrangement of the substrates in an apparatus that can apply or feed the adhesive while the pair of substrates is held with respective bond faces opposed to each other. It is additionally required in the method to send a pair of substrates holding the adhesive layer therebetween to a setting apparatus in order to set the adhesive and to handle the substrates efficiently and correctly to prevent bad influences upon the processing accuracy of the optical disks.

For instance, since substrates of each pair are manufactured or prepared separately due to a difference in material and structure of recording layers, it is troublesome to correctly combine the plurality of kinds of substrates and feed them to a predetermined position. Even after the adhesive layer is formed at the interval of the substrates, there is a possibility that the substrates and adhesive layer will be moved or deformed before the adhesive layer is set. The substrates and adhesive layer should be treated to avoid such inconveniences, which is a difficult task.

SUMMARY OF INVENTION

An object of the present invention is to provide a method and an apparatus for manufacturing optical disks which handles substrates correctly and efficiently to thereby obtain optical disks of high quality and high performance in the above-described technique of manufacturing optical disks.

In accomplishing these and other aspects, according to a first aspect of the present invention, there is provided a method for manufacturing optical disks by bonding each pair of substrates via an adhesive, which comprises processes of:

(a) aligning substrates to be paired in an alternating row of a plurality of paired substrates with respective bond faces thereof facing in one direction;

(b) turning over one substrate of each pair of substrates adjacent to each other in the aligned row and holding the one and the other substrates of the pair with respective bonding faces facing each other;

(c) supplying the pair to a bonding position while holding the pair in a state facing each other;

(d) feeding an adhesive into an interval of the substrates held confronting each other at the bonding position, reducing the interval and spreading the adhesive in a radial direction while rotating the substrates around a center axis of the substrates, to thereby form an adhesive layer between the substrates;

(e) supporting from below a lower substrate of the pair of substrates confronting each other via the adhesive layer, and sending the substrates from the bond position to a setting position;

(f) setting the adhesive layer at the set position to unite the substrates in one body, thereby obtaining an optical disk; and (g) removing the optical disk from the setting position.

According to a second aspect of the present invention, there is provided a method for manufacturing optical disks according to claim 1, wherein the process (a) includes processes of:

(a-1) sequentially piling and accumulating only substrates of the same kind among the pairs; and (a-2) alternately taking out the accumulated substrates and aligning them with respective bonding faces facing in the one direction.

According to a third aspect of the present invention, there is provided a method for manufacturing optical disks according to the first or second aspect, wherein in the process (b) the one substrate is a leading substrate of the aligned row and the other substrate is a substrate next to the leading substrate of the aligned row.

According to a fourth aspect of the present invention, there is provided a method for manufacturing optical disks according to any one of the first to third aspects, wherein the adhesive is fed annularly in the process (d).

According to a fifth aspect of the present invention, there is provided a method for manufacturing optical disks according to any one of the first to fourth aspects, which further includes, between the process (d) and (e), a process (d+) of rotating the substrates holding the adhesive layer therebetween in the planar direction to thereby adjust a thickness of the adhesive layer.

According to a sixth aspect of the present invention, there is provided a method for manufacturing optical disks according to any one of the first to fifth aspects, which further includes, after the process (g), a process (h) of inspecting the optical disk.

According to a seventh aspect of the present invention, there is provided an apparatus for manufacturing optical disks by bonding substrates in pairs via an adhesive, which comprises:

an alignment transfer device for aligning and transferring substrates to be paired with respective bonding faces facing in one direction;

a turn-over holding device which turns over one substrate of each pair of substrates adjacent to each other at the alignment transfer device and holds the one and the other substrates of the pair in a state with respective bonding faces facing each other;

a bonding device;

a substrate feed device for feeding the pair of substrates to the bonding device while holding the pair in the state facing each other;

the bonding device including a substrate holding device which holds the pair of substrates fed from the feed device in a state facing each other, can change an interval of the substrates and rotate the substrates in a planar direction, and an adhesive discharge device which can freely move toward and away from the interval of the substrates from beside the substrates held by the substrate holding device and discharge the adhesive;

a setting device;

a pre-setting transfer device prior to setting which supports from below a lower substrate of the pair of substrates piled via the adhesive at the bonding device and transfers the pair from the bonding device to the setting device;

the setting device setting the adhesive between the substrates transferred by the transfer device to thereby obtain an optical disk of the united substrates; and a take-out device for removing the optical disk from the setting device.

According to an eighth aspect of the present invention, there is provided an apparatus for manufacturing optical disks according to the seventh aspect, and which further comprises:

a pair of substrate accumulating devices where only substrates of the same kind among the pairs are sequentially accumulated via spacers with the bonding faces facing in the one direction;

a spacer collecting device for sequentially piling and collecting the spacers; and a turning transfer device having four transfer arms, which extend in four radial directions and which turn integrally, for holding the substrates and spacers, wherein the pair of substrate accumulating devices are disposed in two opposing directions of the four radial directions relative to a turning center of the transfer device, the spacer collecting device is disposed in another one of the four radial directions and the alignment transfer device is in the remaining one of the four radial directions, so that the turning transfer device alternately removes substrates from the paired substrate accumulating devices and sends the substrates to the alignment transfer device and sends the spacers from between the paired substrates to the spacer collecting device.

According to a ninth aspect of the present invention, there is provided an apparatus for manufacturing optical disks according to the seventh or eighth aspect, wherein the substrate feed device has a transfer member reciprocating between the turnover holding device and the bonding device, and suction parts arranged at front and rear faces of an end of the transfer member for sucking and holding the substrates.

According to a tenth aspect of the present invention, there is provided a method for manufacturing optical disks according to any one of the first to sixth aspects, which further includes a process for controlling, when the adhesive is inserted into the interval between substrates at each of the bonding sections, so as to prevent stoppage of transfer of the substrates with the adhesive before the adhesive is set.

According to an eleventh aspect of the present invention, there is provided an apparatus for manufacturing optical disks according to any one of the seventh to ninth aspects, which further includes a controller for controlling, when the adhesive is inserted into the interval between substrates at each of the bonding sections, so as to prevent stoppage of transfer of the substrates with the adhesive before the adhesive is set.

BRIEF DESCRIPTION OF DRAWINGS

These and other aspects and features of the present invention will become clear from the following description taken in conjunction with the preferred embodiments thereof with reference to the accompanying drawings, in which.

DETAILED DESCRIPTION OF THE INVENTION

Figure 1:
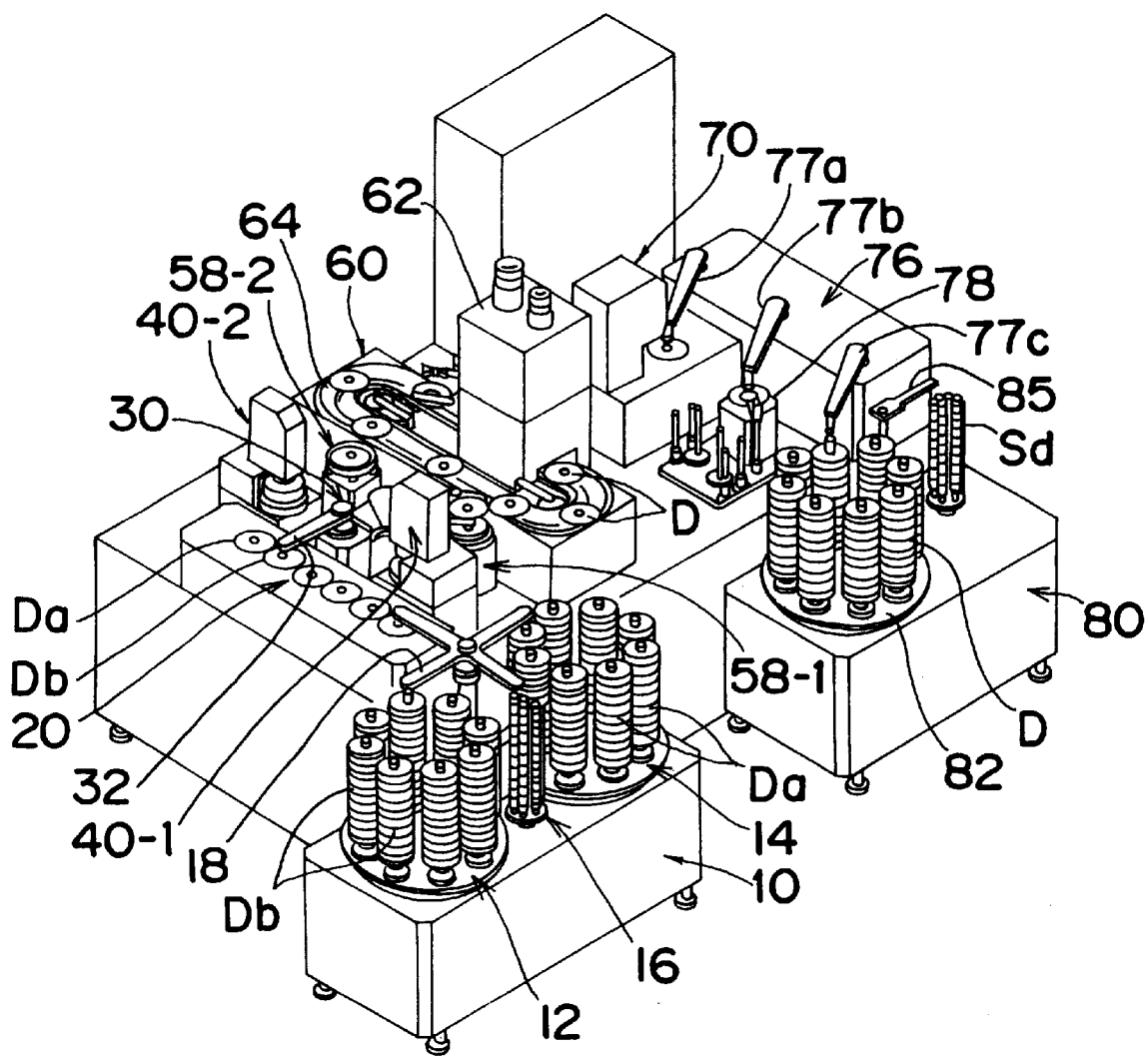
FIG. 1 is a perspective view of an optical disk bonding apparatus in an embodiment of the present invention.

Before the description of the present invention proceeds, it is to be noted that like parts are designated by like reference numerals throughout the accompanying drawings.

A method for manufacturing an optical disk according to an embodiment of the present invention forms an optical disk by bonding a pair of substrates via an adhesive, and the method comprises:

(a) aligning substrates to be paired in an alternating row of a plurality of paired substrates with respective bonding faces thereof facing in one direction;

(b) turning over one substrate of each pair of substrates adjacent to each other in the aligned row and holding the one and the other substrates of the pair with respective bond faces facing each other;

(c) supplying the pair to a bonding position while holding the pair in a state facing each other;

(d) feeding an adhesive into an interval of the substrates held confronting each other at the bonding position, reducing the interval and spreading the adhesive in a radial direction while rotating the substrates in a planar direction (rotated around a center axis of the substrates), to thereby form an adhesive layer;

(e) supporting from below a lower substrate of the pair of substrates confronting each other via the adhesive layer, and sending the substrates from the bonding position to a setting position;

(f) setting the adhesive layer at the setting position to unite the substrates in one body, thereby obtaining an optical disk; and (g) removing the optical disk from the setting position.

A constitution of each part will be specifically described below.

Optical Disk

Among various kinds of optical disks such as CDs, PDs (Phase Change Optical Disks), LDs (Laser Disks), etc. in addition to DVDs, the present invention is applied to optical disks of a bonded type which are constituted by bonding a plurality of substrates. A single recording layer or a plurality of recording layers are provided in the bonded type optical disk.

Substrate

The substrate is formed of a suitable combination of synthetic resins, metallic thin films and the other materials to conform to uses, e.g., a single-sided board for DVDs. The DVD is constituted of a disk main body of transparent resin such as polycarbonate resin or the like, and a recording layer obtained by arranging a metallic thin film at a recording face of one face of the disk main body. A protecting film is sometimes formed on a surface of the recording layer. In general, the face where the recording layer is formed is a bonding face.

Substrates to be bonded with each other can be of the same material and the same structure or of different materials or different structures. Paired substrates are generally different at least in the structure of the recording layers. The recording layer may be eliminated from one of the pair of substrates. Although the substrate for DVDs is a thin circular plate, a shape of the substrate may be any shape depending on the usage of the bonded substrates. Otherwise, the substrates can be shaped after being bonded with each other. For example, the optical disk for one type of DVDs can be constructed by a transparent upper substrate and a lower aluminum substrate, and an optical disk for another type of DVDs can be constructed by an upper aluminum substrate and a lower gold substrate.

Adhesive

Various kinds of adhesives are used depending on the materials and purposes of the substrates to be bonded. A transparent adhesive capable of being set by ultraviolet rays is preferred for DVDs. Other than the adhesive capable of being set by the ultraviolet rays, an adhesive capable of being set by radioactive rays, a self-setting adhesive, a thermosetting adhesive and the like are utilizable. An opaque adhesive can also be used depending on the purpose.

(a) Alignment Process

An aligning and transferring device such as a conveyor or the like for aligning and transferring the substrates in one direction is employed. When substrates to be paired are alternately supplied at the upstream side of the conveyor, the substrates are alternately arranged and transferred on the conveyor. It is preferable that the transferring device supports an outer circumference or a lower face of the substrate without touching the bonding face of the substrate. Or, a central part or a non-recording part at the outer circumferential part of the bonding face of the substrate may be supported.

The following two processes can be combined with each other as the alignment process.

(a-1) a process of sequentially piling and accumulating substrates of the same kind among the pairs of substrates;

(a-2) a process of taking out the accumulated substrates alternately and aligning them with respective bonding faces facing in one direction.

In piling and accumulating the substrates, through-holes formed at the centers of each of the substrates are sequentially fitted to rod-like supporting struts to pile the substrates, whereby the substrates are prevented from being displaced or collapsing.

If the substrates are accumulated with the bonding faces directed upward, the substrates can be directly sent to the alignment process in the same attitude as they are. When the bond faces are turned upside down, the substrates should be reversed to turn the bonding faces upward before being sent to the alignment process.

A spacer if inserted between the accumulated substrates prevents contact between of the substrates.

Synthetic resin, ceramic or the like that can be stacked in contact with the substrates is used as a material for the spacer. An outer diameter of the spacer is preferably smaller than an inner diameter of the recording face of the substrate. When a through-hole similar to that of the substrate is formed at the center of the spacers, the substrates and spacers can be fitted and overlapped alternately with the use of the above supporting strut.

When the accumulated substrates are to be removed from the supporting strut, spacers are taken out and collected at a different position, so that the spacers can be re-used.

A general transfer means for sheet- or plate-like members can be employed to take out the accumulated substrates and collect the spacers.

(b) Holding Process

A pair of substrates are held in a state with the bonding faces opposed to each other so as to facilitate a bonding operation. One of the pair of substrates adjacent to each other in the aligned row is turned over at the downstream side of the above transferring device such as the conveyor or the like. More specifically, an arm or a chuck member for holding the substrates is turned 180° in an upside-down direction with the utilization of a cam-gear mechanism, etc. For supporting the substrate even in the reversed state, a turn-over mechanism is preferably of a type supporting the substrate by a suction means or the like through contact with front and rear faces of the substrate or catching and supporting the outer circumference of the substrate. The turn-over mechanism may be incorporated as a part of the transferring device such as the conveyor or the like or, arranged at a downstream end part of the transferring device separately from the transferring device.

The reversed substrate is held to confront the adjacent substrate via an interval. The interval of the substrates may or may not be equal to an interval therebetween when the substrates are fed to a bonding position to be described later.

If the reversed substrate is a leading one of the aligned row of substrates and the other substrate to confront the reversed substrate is the next one of the row, the row of the substrates can be sent to a succeeding process sequentially in the order beginning with the leading substrate.

Meanwhile, the substrate next to the leading one may be reversed instead of the leading one and faced to the leading one.

(c) Feeding Process to Bonding Position

The pair of substrates held to confront each other in the above turnover process are supplied to the bonding position in the same attitude. Although the pair could be moved by different transfer means, the substrates in the state facing each other can be handled at one time if a transfer or feed means, for example, a turning arm or the like is adapted to hold both substrates respectively at both faces thereof When a hook member or a vacuum suction part, etc. are provided at both faces of the above substrate feed means, the substrates can be held at both faces of the feed means. In this case, it is preferred that the feed means handles the substrates without touching recording faces of the substrates.

(d) Bonding Process

The method and apparatus revealed in the earlier- mentioned International Publication No. WO 97/35720, etc. are employed in this process.

More specifically, a pair of rotary holding panels spaced via a distance in the up-down direction are used as a means for holding the substrates. Preferably, the rotary holding panels rotate synchronously and one or both of the rotary panels are arranged to be freely movable up and down. If a vacuum suction hole(s) is formed at a surface of the holding panel, the substrate can be securely held by way of vacuum suction.

The distance between the holding panels is preferably set in a manner as follows. A relatively large distance is maintained to allow the substrates to enter between the rotary holding panels when the substrates are supplied from the substrate feed means. When the adhesive is supplied, the distance between the panels is reduced to an extent so that the discharged adhesive comes in contact with both substrates. The distance is further narrowed so as to expand the adhesive in the radial direction. At a final stage when the adhesive layer is formed, the distance is set to obtain the adhesive layer of a predetermined thickness. When the substrates are transferred to a setting part after the adhesive layer is formed between the substrates, the distance between the holding panels is increased to receive a transfer means prior to setting which will be described later.

As an adhesive discharge means, an adhesive discharging section equipped with an adhesive storing part and a discharge nozzle shaped like a hollow needle is set in a manner to be freely moved forward and backward with the use of a cylinder mechanism, a motor-gear mechanism or the like operating mechanism. A heating means for the adhesive may be installed at the discharging section.

If the adhesive is injected between the substrates into a concentric ring with the center of the rotary holding panels, the adhesive is easily expanded uniformly in the radial direction.

A process described hereinbelow may be added after the above bonding process. (d+) Process of adjusting thickness of adhesive layer by rotating substrates at high speed in planar direction (rotated around a center axis of the substrates)

When the substrates are rotated at high speed, the adhesive layer is formed uniformly in the interval of the substrates in a constant thickness corresponding to a rotational speed. Excess adhesive is discharged from the outer circumference. The rotational speed is adjusted in a range of several thousand rpm. The thickness of the adhesive layer is determined by characteristics of the used adhesive or the rotational speed.

Although the substrates can be rotated at high speed while being held by the rotary holding panels at the bonding position, a device specially designed for the holding and rotating of the substrates may be adopted. The substrates are transferred from the bonding position to the high-speed rotation device with the use of a transfer means used in a process (f) described later.

(e) Transfer Process to a Set Position

Basically, a general transfer device for plate-like members is used. There is a possibility that the substrates and adhesive layer will be shifted or deformed before the adhesive layer is set due to a certain level of fluidity and deformability of the adhesive layer before it is set. As such, it is necessary to prevent the shift or deformation of the substrates and adhesive layer when the substrates are transferred from the bonding position to the set position. In addition, the adhesive in the interval between the substrates is probably exposed to the outer circumferential end part or partly bulges out, and if the adhesive adheres to the transfer member, the adhesive contaminates the transfer member or re-adheres from the transfer member to the substrates to thereby contaminate the substrates.

In order to avoid this inconvenience, the substrates are transferred while the lower substrate is supported from below. Concretely, a holding member coming in contact only with a lower face or an outer circumferential end face of the lower substrate is used to hold and transfer the substrates piled via the adhesive. It is preferable not to greatly incline the substrates and adhesive layer or cause a large acceleration of or impact to the substrates and adhesive layer. If the lower substrate is not only held by the holding member, but also held by suction when supported from below, the holding of the substrate is more surely realized.

(f) Setting Process

A suitable setting device is employed in conformity with the kind of the adhesive used. For instance, in the case of the adhesive capable of being set by ultraviolet rays, an ultraviolet ray projection device is employed. If the adhesive is a type capable of being set by heating, an infrared ray projection device is utilizable.

If a set time is variably controlled in the setting device used in the setting process, conditions can be set appropriately to suit the purpose.

(g) Take-out Process

When the adhesive layer is set and both substrates are united to thereby constitute an optical disk, a transfer means for general optical disks is used to remove the optical disk from the setting position.

The optical disk removed from the setting position can be subjected to various treatments in the same manner as in the general manufacturing process. For example, an inspection process for inspecting a state of the optical disk can be carried out. The optical disks may be collected in a piled state to be handled with ease. At this time of piling the optical disks, a spacer may be interposed between the optical disks to eliminate contact of the recording faces of the optical disks. The optical disks can be piled directly one by one without using a spacer.

Substrate Feed Device

A device described below is employed to feed substrates to the alignment transfer section.

The device includes a pair of substrate accumulating sections for sequentially piling and accumulating substrates of the same kind via spacers with bonding faces directed in one direction, a spacer collecting section for sequentially piling and collecting spacers, and a turning transfer means with four transfer arms, which extend in four radial directions and turn integrally together, for holding the substrates and spacers. The pair of substrate accumulating sections are disposed in two opposing directions of the four radial directions relative to a turning center of the transfer means, while the spacer collecting section is disposed in another one of the four radial directions and the alignment transfer section is disposed in the remaining one of the four radial directions. The substrates at the pair of substrate accumulating sections are alternately removed by the transfer means and sent to the alignment transfer section. At the same time, the spacers are carried to the spacer collecting section.

The substrates may be accumulated in one row or in a plurality of rows at the accumulating section. Any of the plurality of rows of the substrates loaded on a turntable that is freely turnable may be sent to a position of the transfer arms of the transfer means through the intermittent rotation of the turntable. Also in the spacer collecting section, the spacers are accumulated in one row or a plurality of rows and a turntable is similarly usable for the spacers.

In the above substrate feed device, simply by reciprocating the transfer means with four transfer arms alternately in front and rear directions with a fixed angle, not only can the substrates to be paired be supplied alternately to the alignment transfer section, but the spacers can be collected, correctly and efficiently.

Figure 2:
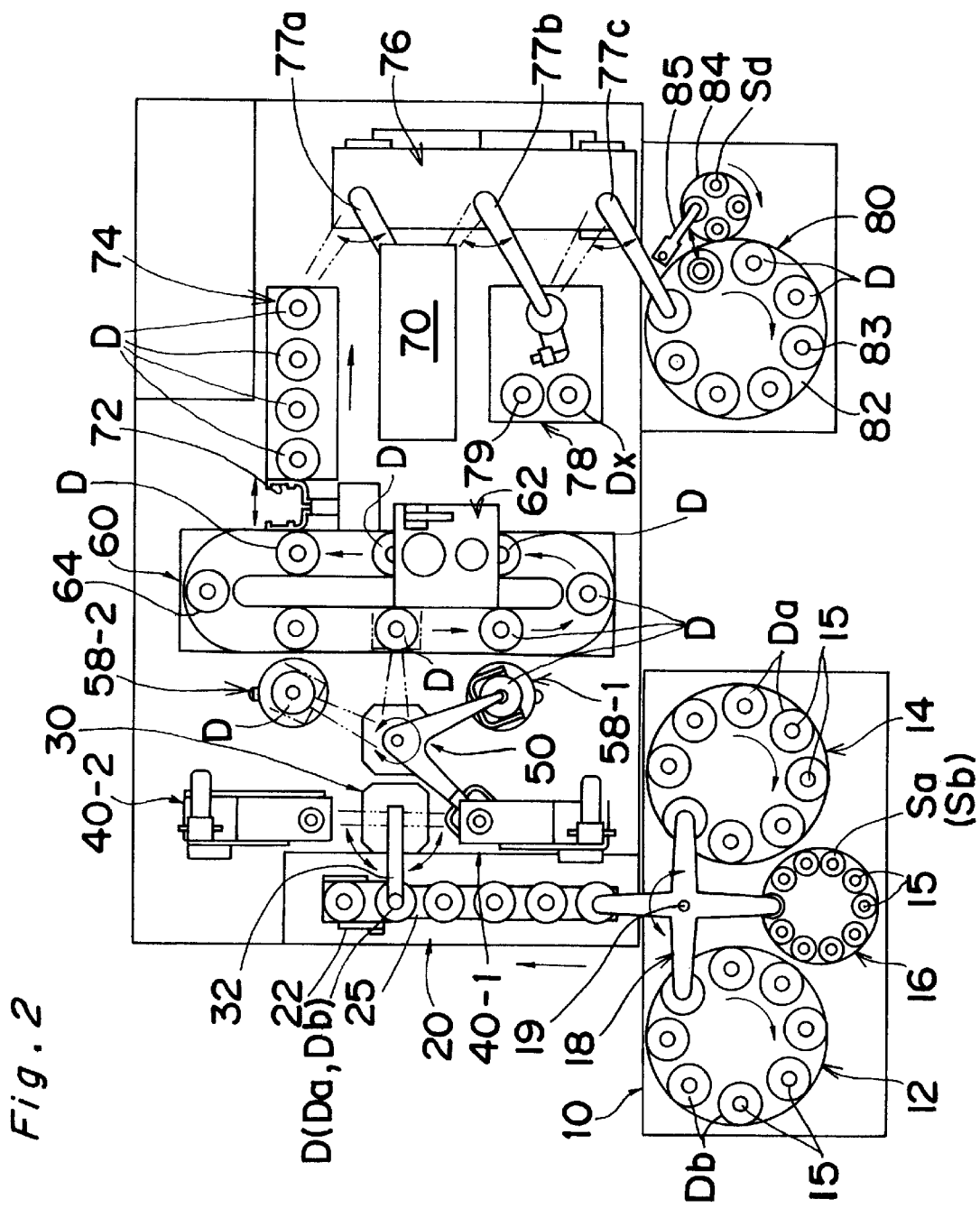
FIG. 2 is a plan view of FIG. 1.

An apparatus for manufacturing optical disks constructed as a whole as shown in FIGS. 1 and 2 is used to obtain DVDs. A substrate Da and a substrate Db are used to constitute the optical disk. The substrates Da, Db are formed of transparent polycarbonate resin or the like in a fundamentally common shape although materials and structures of recording layers are different.

The manufacturing apparatus comprises a substrate accumulating sectionlo where substrates Da, Db are accumulated, an alignment transfer section 20 for aligning and transferring the substrates Da, Db, bonding sections 40 each for bonding the substrates Da, Db with an adhesive, a setting section 60 for setting the adhesive by ultraviolet rays, an inspecting section 70 for inspecting manufactured optical disks, and an optical disk accumulating section 80 where the optical disks are accumulated.

Substrate Accumulating Section

The substrate accumulating section 10 has a pair of turntables 12, 14 which can turn in the horizontal direction. Supporting struts 15 are set via a suitable distance along an outer circumference of each turntable 12, 14. Substrates Da, Db prepared beforehand are piled at the supporting struts 15.

Figure 3:
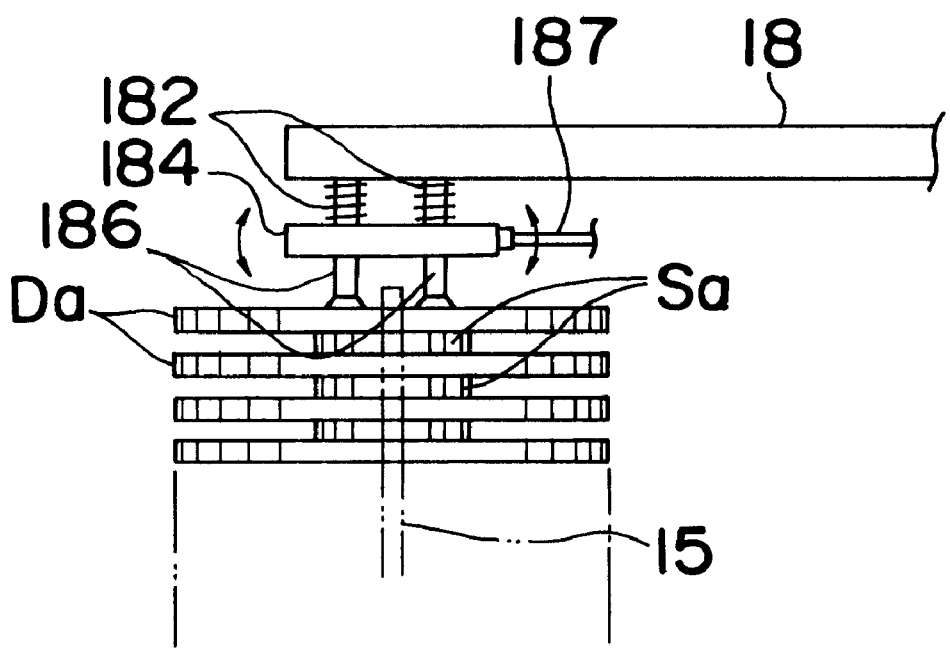
FIG. 3 is a side view showing a detailed structure of a substrate accumulation section of FIG. 1.

As is shown in FIG. 3 in detail, disk-shaped substrates Da with holes are sequentially fitted to each of the supporting struts 15, and small disk-shaped spacers Sa with holes are held between the substrates Da. Surfaces, particularly, recording faces of the adjacently upper and lower substrates Da are hence prevented from being damaged through contact with each other. The substrates Da are accumulated with the recording faces, namely, bonding faces directed upward. An outer diameter of the spacer Sa is set to be smaller than an outline of the non-recording part at the center of the substrate Da, and therefore the spacer Sa is adapted to avoid contact with the recording part of the substrate Da. The spacer Sa is a plastic mold.

An urging means such as a spring or the like is installed at a lower part of each strut 15 to urge the accumulated substrates Da and spacers Sa upward, so that an upper end of a pile of the accumulated substrates Da and spacers Sa is always positioned in the vicinity of an upper end of the strut 15. The substrates Da are sequentially taken out beginning with an uppermost spacer.

The above description relating to the substrates Da applies to the substrates Db as well.

As shown in FIGS. 1 and 2, a turntable 16 is disposed between the turntables 12 and 14 to collect the spacers Sa, Sb. Supporting struts 15 are erected similarly along an outer circumference of the turntable 16 via a suitable distance. Used spacers Sa, Sb are sequentially fitted and collected at the supporting struts 15.

Turning Transfer Means

As shown in FIGS. 1 and 2, a cross-shaped turning arm 18 is fitted at a position surrounded by the substrate turntables 12, 14 and spacer turntable 16, which is freely turnable and movable up and down. The cross-shaped turning arm 18 has four arms extending in four directions outward from a turning shaft 19 at the center. The four arms turn integrally in any of the right and left directions. The turning arm 18 is integrally moved up and down by moving the turning shaft 19 up and down because of the driving of a turning shaft driving motor 19z.

Leading ends of three arms of the cross-shaped turning arm 18 are located immediately above the substrates Da, Db accumulated at the turntables 12, 14 and one strut 15 of the turntable 16 respectively, and a leading end of the remaining one arm is present above the alignment transfer section 20.

As indicated in FIG. 3, a suction plate 184 is mounted at a leading lower end part of the turning arm 18 via springs 182 in a movable fashion in the up-down direction. Suction nozzles 186 are fitted at a lower face of the suction plate 184, which are coupled to a vacuum suction source (not illustrated) via a vacuum pipe 187.

When the suction nozzles 186 suck (i.e. draw and hold by suction) the non-recording part at the center of the substrate Da, the substrate Da is sucked and held to the turning arm 18. At this time, even if the substrate Da is shifted or inclined in attitude relative to the suction nozzle 186, the suction nozzle 186 can surely suck the substrate Da owing to the action of the springs 182 inclining the suction plate 184 back and forth and right and left. Moreover, the springs 182 ease impacts when the suction nozzles 186 contact the substrate Da.

An outer diameter of each suction nozzle 186 fitted to the suction plate 184 is set so that the suction nozzle can suck the non-recording part of the substrate Da and spacer Sa.

Operation of Turning Arm

Figure 4:
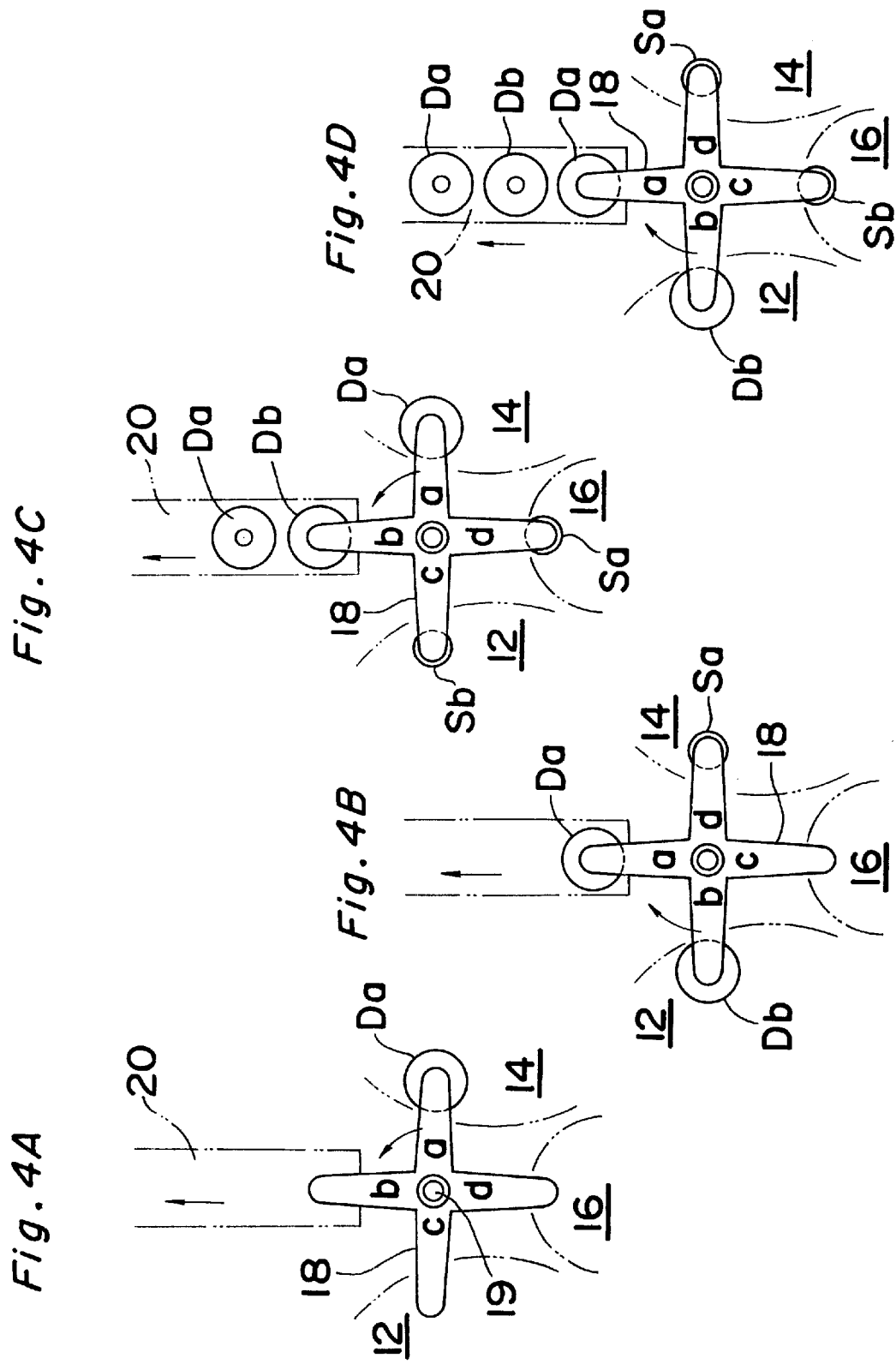
FIGS. 4A, 4B, 4C, 4D are diagrams explanatory of an operation of a turning transfer means of FIG. 1.

As shown in FIGS. 4A–4D, the cross-shaped turning arm 18 is turned by 90° intervals alternately right and left about the turning shaft 19.
Stage A:
As in FIG. 4A, when one arm (a) of the turning arm 18 is arranged immediately above the substrate Da on the turntable 14, the whole turning arm 18 falls down to suck the substrate Da by the suction nozzles 186. When the turning arm 18 moves up, the suction nozzles 186 take up the substrate Da.
Stage B:
In FIG. 4B, when the turning arm 18 turns 90° in a counterclockwise direction, the substrate Da held by the arm (a) is brought to immediately above the alignment transfer section 20. As the suction nozzles 186 halt the suction, the substrate Da falls and is fed to the alignment transfer section 20. The substrates Da supplied in this manner to the alignment transfer section 20 are sequentially sent downstream (to the upper side of the alignment transfer section 20 in the drawing).

At this time, an arm (b) adjacent to the arm (a) in the counterclockwise direction is present immediately above the substrate Db on the turntable 12, sucking and taking up the substrate Db in the same manner.

An arm (d) next to the arm (a) in a clockwise direction is located immediately above the spacers Sa piled alternately with the substrates Da at the turntable 14, and performs sucking and taking out of the spacer Sa.

Stage C:

When the entirety of the turning arm 18 turns 90° in the clockwise direction as shown in FIG. 4C, the arm (a) is sent to immediately above another substrate Da at the turntable 14 and sucks and takes up the substrate Da.

In the meantime, the arm (b) is sent to immediately above the alignment transfer section 20 and feeds the substrate Db to the alignment transfer section 20. At the alignment transfer section 20, since the substrate Da supplied earlier has moved downward, the substrate Db is arranged at the upstream side next to the substrate Da.

An arm (c) present immediately above the spacers Sb alternately piled with the substrates Db at the turntable 12 sucks and takes out the spacer Sb.

The arm (d) sends the spacer Sa to the turntable 16 and inserts the spacer Sa on the supporting strut 15 of the turntable 16 to thereby collect the spacer.

Stage D:

In FIG. 4D, when the turning arm 18 integrally turns 90° in the counterclockwise direction, the arm (a) is brought to above the alignment transfer section 20 again to feed the substrate Da to the alignment transfer section 20.

The arm (b) takes up the substrate Db at the turntable 12. The arm (c) carries the spacer Sb to the turntable 16. The arm (d) takes up the spacer Sa from the turntable 14.

By the repetition of procedures in stages A through D, the substrates Da and Db are alternately picked up from the turntables 14 and 12 to be sent to the alignment transfer section 20, while the spacers Sa, Sb after being used are collected at the turntable 16.

At the alignment transfer section 20, the substrates Da and Db are sequentially transferred downstream with the bonding faces facing in one direction.

Alignment Transfer Section

As shown in FIGS. 1 and 2, the alignment transfer section 20 is provided with a conveyor 25 for intermittently transferring the substrates Da, Db in one direction, for example, at intervals longer than the outer diameter of the substrate.

Figure 5:
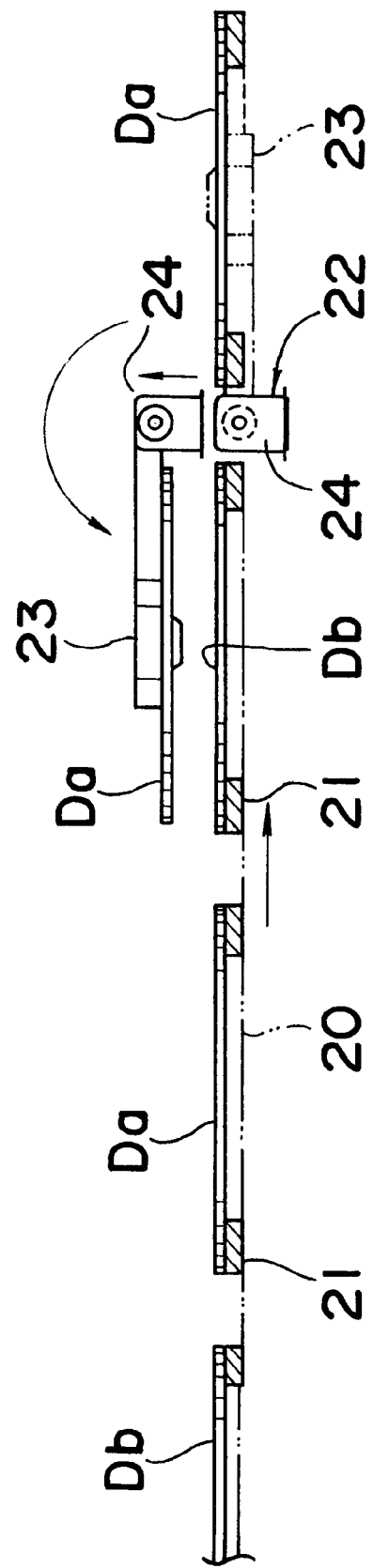
FIG. 5 is a side view showing a substrate turn-over mechanism of FIG. 1.

Referring to FIG. 5, the substrates Da, Db are transferred in a state with outer circumferential parts thereof loaded on supporting frames 21. The supporting frames 21 support the substrates by contacting the non-recording parts at the outer circumferences of the substrates Da, Db.

A turn-over mechanism 22 is installed at the lowest part of the stream of the alignment transfer section 20.

The turn-over mechanism 22 has a turn-over arm 23 which raises and holds the substrate Da, Db supported by the supporting frame 21 through contact with the lower face of the substrate Da, Db, and a reversing supporting section 24 which turns and reverses the turn-over arm 23 within a perpendicular plane and is movable up and down.

The turn-over arm 23 has an L-shaped plane, one end of which comes in contact with the non-recording part at the center of the substrate Da, Db to thereby hold the substrate Da, Db. The turn-over arm 23 traversing the conveyor 25 extends sideways, bends at a side of the conveyor 25 to be parallel to the conveyor 25 and is supported by the reversing supporting section 24. The reversing supporting section 24 is arranged at the lateral side of the conveyor 25 for supporting the turn-over arm 23.

Upon reaching a position of the turn-over arm 23, the substrate Da carried downstream on the conveyor 25 is held by the turn-over arm 23. After the reversing supporting section 24 rises together with the turn-over arm 23, the turn-over arm 23 is reversed to the upstream side of the conveyor 25, whereby the substrate Da is held via a space immediately above the substrate Db transferred next to the substrate Da. As a result, the respective bonding faces of the substrates Da and Db are faced toward each other.

As will be described later, after the substrates Da, Db held opposite to each other are sent out to a next process, the turn-over arm 23 is reversed again and the reversing supporting section 24 descends to return the turn-over arm 23 to a position below the conveyor 25.

Bonding Section

As shown in FIGS. 1 and 2, two bonding sections 40, 40 i.e. 40-1, 40-2 are disposed at a side of the alignment transfer section 20.

Figure 7:
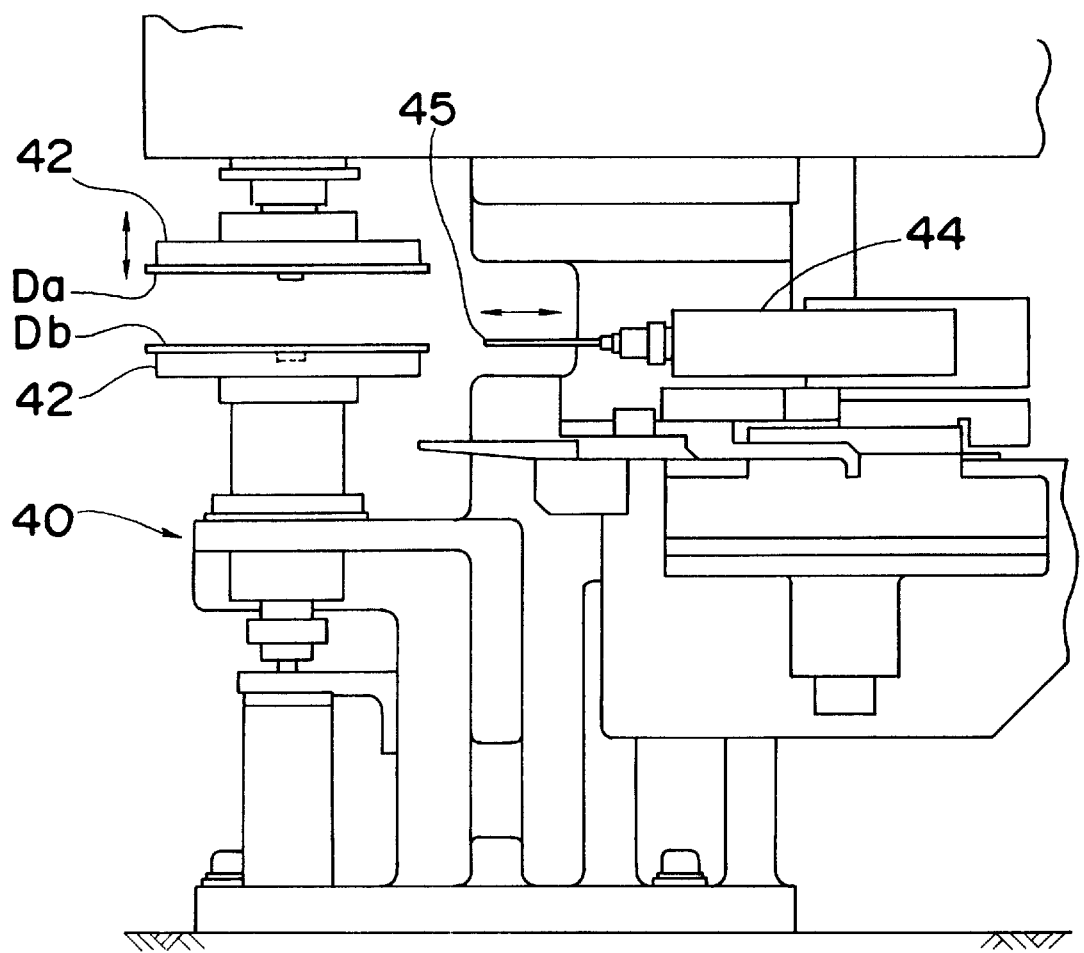
FIG. 7 is a side view of one bonding section of FIG. 1.

In FIG. 7, each of the bonding sections 40 has a pair of upper and lower rotary holding panels 42, 42. Although not shown in the drawing, a rotary force is transmitted from one motor via a rotation transmission mechanism, so that the rotary holding panels 42, 42 rotate synchronously in a horizontal direction. The upper rotary holding panel 42 is moved up and down by the action of a cylinder mechanism or the like.

Figure 8A:
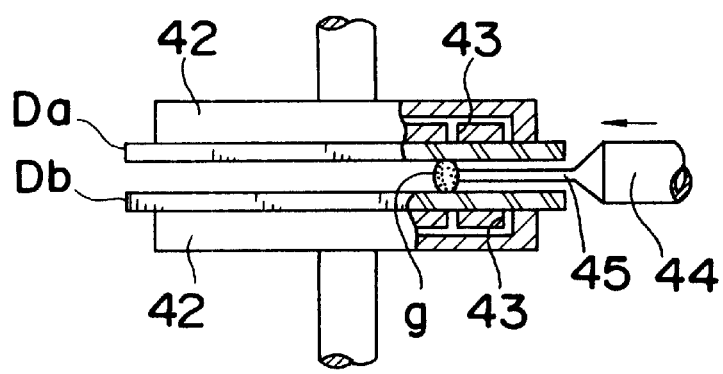
FIGS. 8A, 8B, 8C are step-by-step diagrams showing an operation of the bonding section.

As illustrated in detail in FIG. 8A, vacuum suction holes 43 are formed at confronting faces of the rotary holding panels 42, 42. The vacuum suction holes 43 are coupled to the vacuum source (not shown).

Referring back to FIG. 7, an adhesive feed mechanism 44 is set beside the rotary holding panels 42, 42 in a freely movable fashion in a back-forth direction to the center of the holding panels 42, 42. An adhesive is stored in the adhesive feed mechanism 44. The feed mechanism 44 has a discharge nozzle 45 at a horizontal leading end thereof to discharge the adhesive from a leading end part of the discharge nozzle 45.

Operation of Bonding Section

As indicated in FIG. 8A, the substrates Da, Db are sucked and held to the upper and lower rotary holding panels 42, 42 at each of the bonding sections 40. Even if a slight undulation or waving is brought about to the substrates Da, Db at this time, the substrates are forcibly deformed and corrected along flat surfaces of the holding panels 42, 42, to thereby improve flatness accuracy.

An adhesive g is supplied from the discharge nozzle 45 into an interval of the substrates Da and Db. The discharged adhesive g is in contact with the upper and lower substrates Da, Db.

Figure 8B:
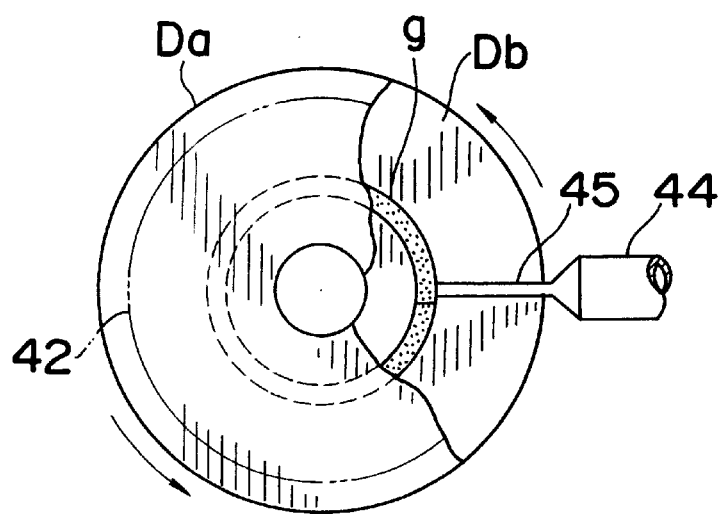

In FIG. 8B, the upper and lower substrates Da, Db are synchronously rotated in the planar direction while the adhesive g is discharged from the discharge nozzle 45, so that the adhesive g is applied annularly.

Figure 8C:
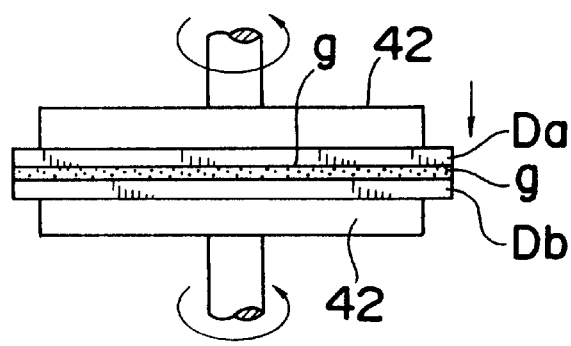

Then, the upper rotary holding panel 42 is lowered to narrow the interval between the substrates Da, Db as in FIG. 8C. The rotary holding panels 42, 42 are further rotated synchronously. The annular adhesive g fed between the substrates Da and Db is spread along the interval both to the center and to the outer circumference in the radial direction. In consequence, the entire interval of the substrates Da and Db is filled with a uniform thin layer.

Holding Transfer Section

In FIGS. 1 and 2, a holding transfer section 30 transfers a pair of substrates Da, Db from the alignment transfer section 20 to the pair of bonding sections 40, 40 while keeping the substrates in a state with the bonding faces opposed to each other.

The holding transfer section 30 is equipped with a turnable transfer arm 32. A leading end of the transfer arm 32 turns alternately to the right and left bonding sections 40, 40 from a position above the alignment transfer section 20.

Figure 6:
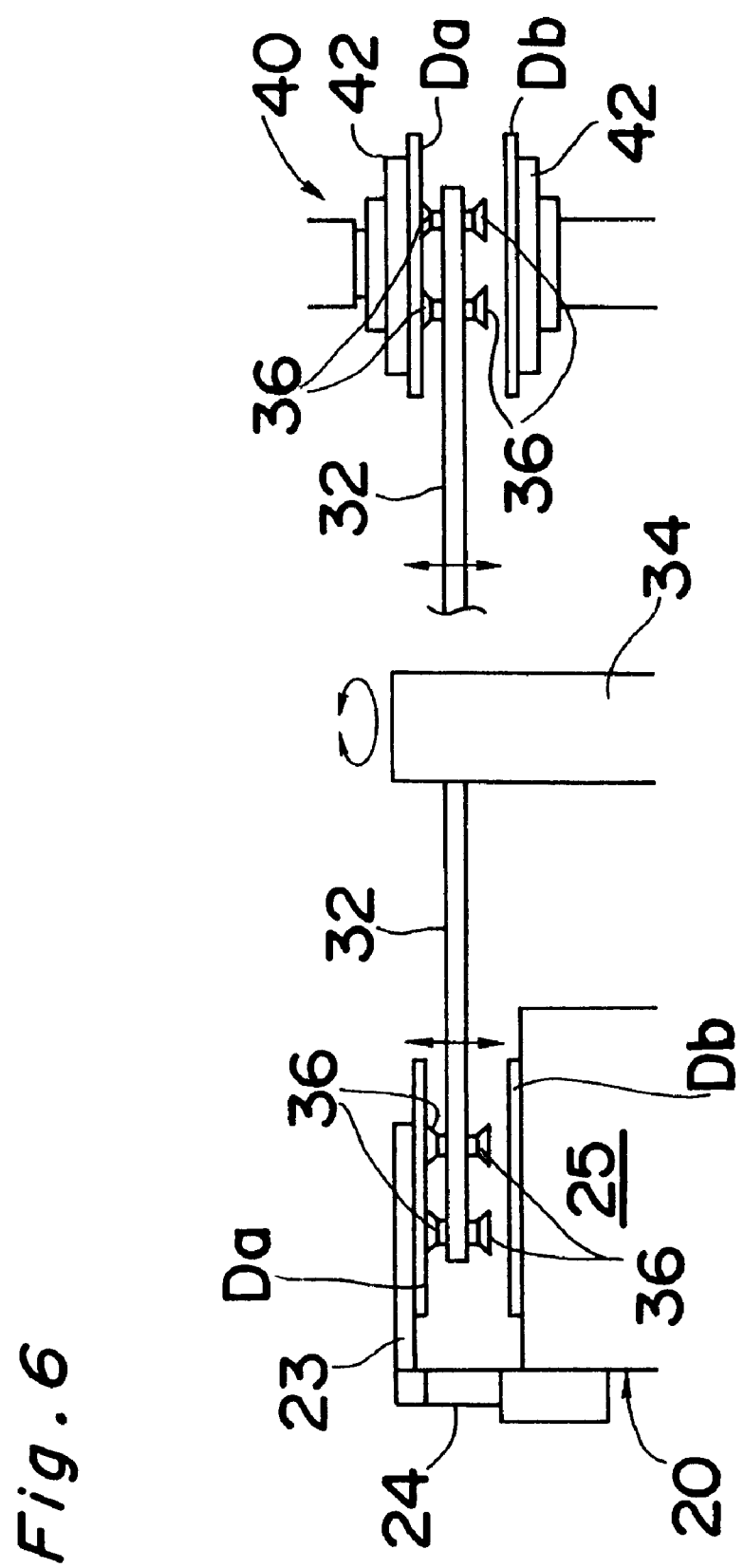
FIG. 6 is a side view of a holding transfer section of FIG. 1.

As shown in FIG. 6, the turnable arm 32 supported by a turning shaft 34 is adapted to be movable also in the up-down direction. Suction parts 36 are provided at upper and lower faces of the leading end of the turnable arm 32. The suction parts 36 are connected to the vacuum suction source (not shown) to thereby suck and hold the substrates Da, Db.

When the transfer arm 32 is inserted between the upper and lower substrates Da and Db facing each other at the alignment transfer section 20, and slightly moved up and down, the substrates Da, Db are sequentially sucked by the suction parts 36 of the transfer arm 32, then moved from the alignment transfer section 20 to the holding transfer section 30. At this time, the suction parts 36 contact the non-recording parts at the center of the substrates Da, Db.

The transfer arm 32 holding the confronting substrates Da, Db is turned and inserted between the rotary holding panels 42 and 42 of the bonding section 40.

The transfer arm 32 is moved up and down, and moreover the suction parts 36 release the substrates Da, Db. The substrates Da, Db are in turn sucked and held by vacuum suction holes 43, 43 of the rotary holding panels 42, 42.

High-speed Rotary Section

Figure 10:
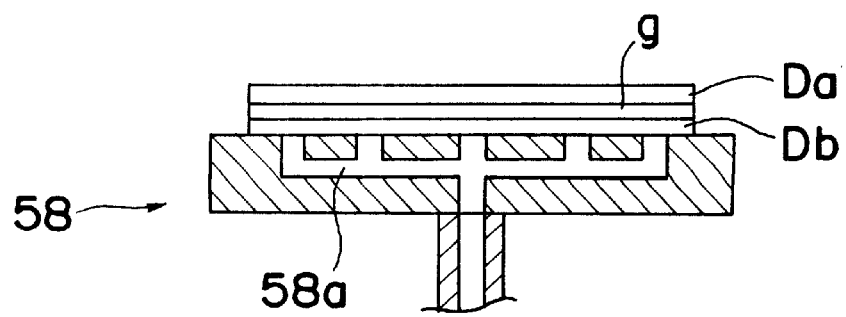
FIG. 10 is a cross-sectional view of a high-speed rotary stage in FIG. 1.

In FIG. 2, high-speed rotary stages 58, 58, i.e. 58-1, 58-2 are arranged adjacent to the bonding sections 40, 40, i.e. 40-1, 40-2. The substrates Da, Db with the adhesive g interposed therebetween are placed on each of the rotary stages 58 through suction by suction holes 58a connected to a vacuum source (not shown) as shown in FIG. 10. The rotary stage 58 is rotated horizontally by a motor or the like, and impresses a centrifugal force to the substrates Da, Db and adhesive g, so that the adhesive g is spread to the outer circumference and adjusted in thickness.

Setting Section

Still in FIG. 2, a setting section 60 includes a conveyor 64 having an elliptic path and an ultraviolet projection section 62 arranged at a halfway point of the conveyor 64. An ultraviolet projection mechanism such as an ultraviolet lamp or the like is fitted in the projection section 62 to project ultraviolet rays to the adhesive g between the substrates Da and Db transferred on the elliptic conveyor 64. Since the substrate Da is transparent or semitransparent, the inside adhesive g can be set even by the ultraviolet rays projected from above the substrate Da.

A run speed of the elliptic conveyor 64 is variably controllable, and therefore a projection time to the adhesive g, namely, a set condition can be determined properly. The substrates can be intermittently transferred on the conveyor 64 by a distance which is equal to or longer than the distance of the projection in the projection section 62, in order to avoid stoppage of the transfer of the substrates during the projection in the projection section 62.

When the adhesive g is set by the projection of ultraviolet rays, the substrates Da, Db are united in one body to thereby complete an optical disk D.

Pre-setting Transfer Section

As shown in FIG. 2, between the bonding section 40 and the elliptic conveyor 64 of the setting section 60, there is constituted a pre-setting transfer section 50 arranged prior to the setting section. Two substrate holding arms 52, 52 are mounted in a V shape at the transfer section 50 prior to setting, which turn integrally in the horizontal direction.

Figure 9A:
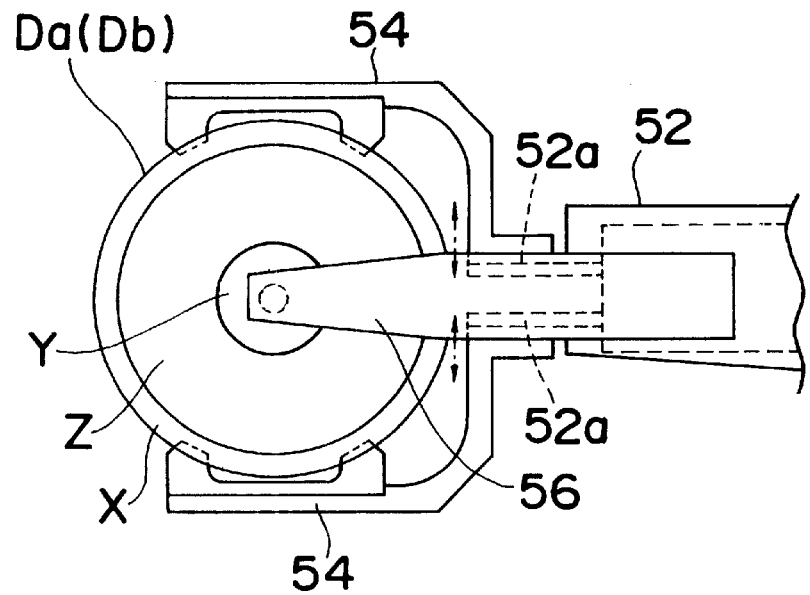
FIGS. 9A and 9B are a plan view of a structure of a substrate holding arm of FIG. 1 and a side view seen from a leading end of the arm of FIG. 1.
Figure 9B:
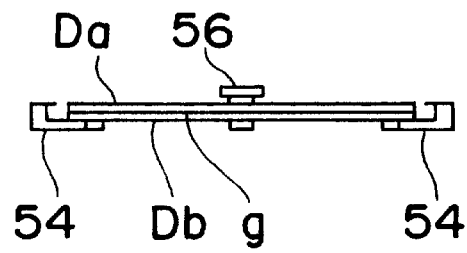

Specifically, in FIGS. 9A and 9B, an approximately U-shaped substrate stage 54 is formed at a leading end of the substrate holding arm 52. An inner circumferential edge of the stage 54 is brought to contact outer circumferential edges of the substrates Da, Db from below to thereby hold the substrates. Each substrate Da, Db has non-recording parts x, y at the outer circumference and center thereof, and a recording part z in the middle of the non-recording parts x, y. The substrate stage 54 contacts only the non-recording part x at the outer circumference of the substrate. A center retaining arm 56 is elongated at the center of the U-shaped stage 54 from the substrate holding arm 52. The center retaining arm 56 is inserted into center holes of the substrates Da, Db to prevent the substrates Da, Db from shifting in the horizontal direction. The two U-shaped stages 54 connected to two arm elements 52a of the substrate holding arm 52 can be moved in both directions where the stages 54, 54 are close to each other and are separated from each other by a known driving device such as a parallel chuck.

The substrate holding arm 52 comes actually in contact with only a lower face of the overlapped substrates Da, Db holding the adhesive g therebetween to hold the substrates Da, Db. Thus, even if the adhesive g is exposed or partly bulges out at the outer circumferential end part of the substrates Da, Db, the substrate holding arm 52 never comes in contact with the adhesive g.

As indicated in FIG. 2, one substrate holding arm 52 is inserted between the upper and lower rotary holding panels 42 and 42 of the bonding section 40 to place the substrates Da, Db holding the adhesive g onto the substrate stage 54.

The one substrate holding arm 52 is turned to above the high-speed rotary stage 58 located at a middle position of the bonding section 40 and setting section 60. The pair of substrates Da, Db is loaded on the high-speed rotary stage 58.

When the one holding arm 52 is turned again to the bonding section 40, the other substrate holding arm 52 forming the V shape with the arm 52 is brought to above the high-speed rotary stage 58, so that the substrates Da, Db are transferred to the other substrate holding arm 52.

In this state, the two substrate holding arms 52 forming the V shape are turned in the counterclockwise direction, whereby the substrates Da, Db having the adhesive g adjusted in thickness at the high-speed rotary stage 58 are transferred onto the elliptic conveyor 64 of the setting section 60. On the other hand, substrates Da, Db at the bonding section 40 are sent to the high-speed rotary stage 58 in the same manner as above.

Thus the substrates Da, Db holding the adhesive g therebetween at the bonding section 40 are, via the high-speed rotary stage 58, carried to the setting section 60.

Since the bonding sections 40 are arranged at two points, the substrate holding arms 52 of the pre-setting transfer section 50 are alternately turned and moved to the right and left bonding sections 40 to fetch the substrates Da, Db. The high-speed rotary stage 58 is disposed at the middle point of each bonding section 40 and setting section 60, where the thickness of the adhesive g between the substrates Da, Db sent from the bonding section 40 is adjusted through high-speed rotation.

That is, when the one substrate holding arm 52 of the transfer section 50 is located at the bonding sections 40-1 to receive the substrates from the bonding sections 40-1, at the same time, the other substrate holding arm 52 of the transfer section 50 is located at the high-speed rotary stage 58-1 to receive the holding substrates from the high-speed rotary stage 58-1. Thereafter, the arms 52 turn counterclockwise, and then, the one substrate holding arm 52 holding the substrates from the bonding sections 40-1 is located at the high-speed rotary stage 58-1 to transfer the holding substrates to the high-speed rotary stage 58-1 and at the same time, the other substrate holding arm 52 holding the substrates from the high-speed rotary stage 58-1 is located at the setting section 60 to transfer the substrates thereto. Thereafter, the arms 52 turn counterclockwise, and then when the other substrate holding arm 52 of the transfer section 50 is located at the bonding sections 40-2 to receive the substrates therefrom, at the same time, the one substrate holding arm 52 of the transfer section 50 is located at the high-speed rotary stage 58-2 to receive the holding substrates therefrom. Thereafter, the arms 52 turn clockwise, and then, the other substrate holding arm 52 holding the substrates from the bonding sections 40-2 is located at the high-speed rotary stage 58-2 to transfer the holding substrates to the high-speed rotary stage 58-2 and at the same time, the one substrate holding arm 52 holding the substrates from the high-speed rotary stage 58-2 is located at the setting section 60 to transfer the substrates thereto. Then, the arms 52 turn clockwise, and then when the one substrate holding arm 52 of the transfer section 50 is located at the bonding sections 40-1 to receive the substrates from the bonding sections 40-1, at the same time, the other substrate holding arm 52 of the transfer section 50 is located at the high-speed rotary stage 58-1 to receive the holding substrates from the high-speed rotary stage 58-1. Such an operation is repeated during the manufacturing process.

Inspecting Section

The optical disk D is sent from the setting section 60 to an inspecting section 70. An outer shape and an internal structure of the optical disk D are inspected, and whether the optical disk D is good or not is judged at the inspecting section 70. An inspection device in the inspecting section 70 is equal to one used for general optical disks.

Transfer from Setting Section to Inspecting Section

Figure 11:
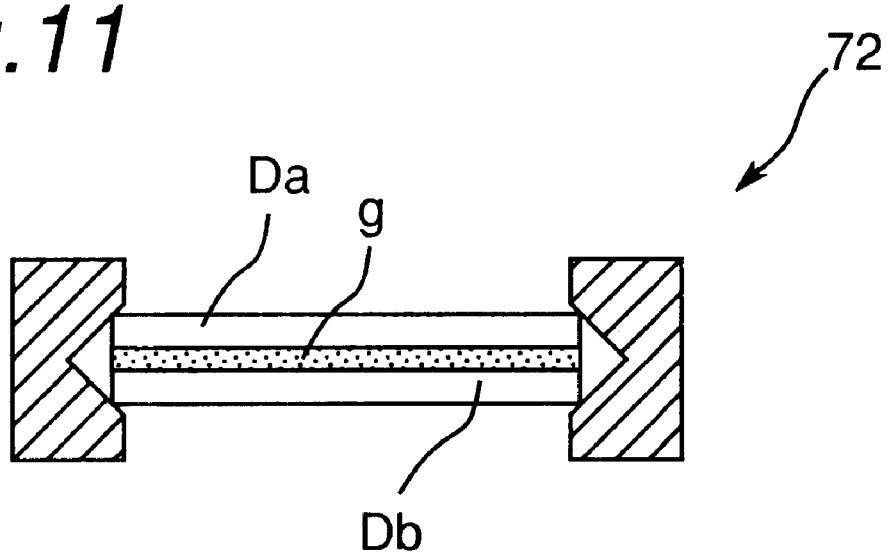
FIG. 11 is a partial cross-sectional view of a transfer arm in FIG. 1.

At the setting section 60, the optical disk D passing through the ultraviolet projection section 62 is taken up from the elliptic conveyor 64 by a transfer arm 72 which is laterally U-shaped as shown in FIG. 11 so as not to release the substrates when the transfer arm 72 is reversed. The transfer arm 72 transfers the optical disk D to the upstream end of a horizontal conveyor 74. The transfer arm 72 is freely reversible about a horizontal axis thereof, and accordingly can move the optical disk D in parallel while keeping the optical disk in a horizontal state or move the optical disk D in parallel after reversing the optical disk. It is decided by a below-described controller 200 whether or not the transfer arm 72 is reversed about the horizontal axis thereof depending on the production type etc. For example, when the upper substrate Da is transparent in one production type, the substrate Da is not revered by the transfer arm 72 while the substrate Da is being transferred by the transfer arm 72. When the upper substrate Da is aluminum and is not transparent and the lower substrate Db is gold and is light-transmittable in another production type, the substrate Da is revered by the transfer arm 72 while the substrate Da is being transferred by the transfer arm 72. The horizontal conveyor, 74 can intermittently transfer the substrates by a distance longer than the outer diameter of the substrate at approximately constant speed.

A reciprocating transfer section 76 is provided at a downstream end part of the horizontal conveyor 74 and beside the inspecting section 70.

The reciprocating transfer section 76 has a reciprocating arm 77a. A leading end of the reciprocating arm 77a when brought to the downstream end part of the horizontal conveyor 74 takes up the optical disk D. When the reciprocating arm 77a turns horizontally, the optical disk D caught by the arm 77a is sent to the inspecting section 70. The optical disks D are sequentially supplied to the inspecting section 70 through the reciprocative turning of the arm 77a.

Defective Product Collecting Section

A defective product collecting section 78 is formed beside the inspecting section 70. Another reciprocating arm 77b of the reciprocating transfer section 76 reciprocatively turns between the inspecting section 70 and the defective product collecting section 78. The reciprocating arm 77b reciprocates in synchronization with the reciprocating arm 77a which reciprocates between the horizontal conveyor 74 and inspecting section 70.

The optical disk D after being completely inspected at the inspecting section 70 is held by the reciprocating arm 77b and temporarily stored on the defective product collecting section 78. Depending on an inspection result at the inspecting section 70, the optical disk D judged to be defective, i.e., defective optical disk Dx at the collecting section 78 is moved to a defective product accumulation section 79 by a different transfer means and piled there.

Optical Disk Collecting Section

An optical disk collecting section 80 is arranged adjacent to the inspecting section 70 and the defective product collecting section 78.

A turntable 82 is set in the optical disk collecting section 80 to collect optical disks D. Supporting struts 83 stand along an outer circumference of the turntable 82, at which the optical disks D are fitted and accumulated.

A turntable 84 collectively storing spacers Sd is arranged beside the turntable 82. A spacer feed arm 85 reciprocates between the turntables 84 and 82.

The reciprocating transfer section 76 has also a reciprocating arm 77c reciprocating between the defective product collecting section 78 and the optical disk collecting section 80.

The reciprocating arm 77c reciprocates synchronously with the reciprocating arms 77b, 77a.

Among the optical disks temporarily stored in the defective product collecting section 78, good disks are sent to the supporting struts 83 of the turntable 82 through the reciprocative motion of the reciprocating arm 77c.

When one optical disk D is laid on the supporting strut 83 of the turntable 82, the spacer feed arm 85 comes turning above the strut 83 to thereby place the spacer Sd on the optical disk D.

Optical disks D and spacers Sd are thus alternately piled and accumulated at the supporting struts 83 of the turntable 82. The spacer feed arm 85 is refrained from operating if the optical disks D alone are to be piled without using spacers Sd.

After a certain number of optical disks D are accumulated, the optical disks D are sent altogether for shipment or supplied to a next process.

Figure 12:
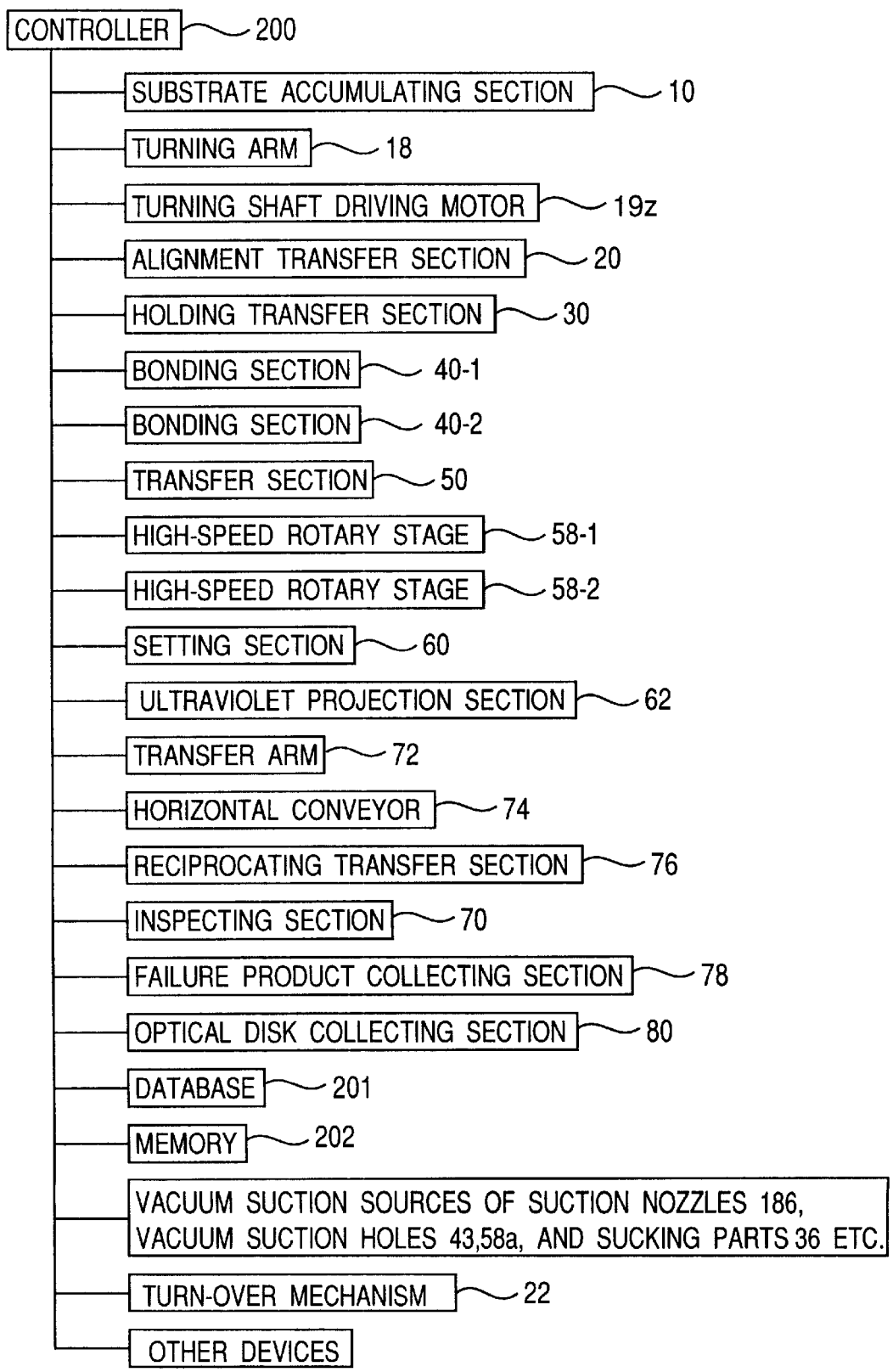
FIG. 12 is a block diagram showing a controller and other devices in the apparatus of FIG. 1.

The above operations are controlled by a controller 200 of the apparatus. That is, the driving sources and devices of the above devices or members are connected to the controller 200 to control the driving sources and devices. For example, as shown in FIG. 12, the substrate accumulating section 10, turning arm 18, turning shaft driving motor 19z, alignment transfer section 20, turn-over mechanism 22, holding transfer section 30, bonding section 40-1, bonding section 40-2, transfer section 50, high-speed rotary stage 58-1, high-speed rotary stage 58-2, setting section 60, ultraviolet projection section 62, transfer arm 72, horizontal conveyor 74, reciprocating transfer section 76, inspecting section 70, defective product collecting section 78, optical disk collecting section 80, vacuum suction source of the suction nozzles 186, vacuum suction source of the vacuum suction holes 43, 58a, vacuum suction source of the suction sections parts 36, and other devices are connected to the controller 200. The controller is also connected to a database 201 storing the mounting programs and the mounting data such as component data and product types, and a memory 202 for temporarily storing the input or calculated data.

The apparatus has an additional feature that the controller 200 controls so as to allow each device to be driven under a specified condition where the sequential device and/or previous devices are prepared to perform the specified operations. Specifically, when the adhesive g is inserted into the interval between substrates Da, Db at each of the bonding sections 40-1 and 40-2, the controller 200 prevents the transfer of the substrates Da, Db with the adhesive g which is not set from being stopped. If the substrates with the adhesive which is not set are not transferred to the high-speed rotary stage 58-1, 58-2, the adhesive g is set in a state where the thickness of the adhesive g between the substrates Da, Db may not be uniform. In order to avoid such an inconvenience, the controller 200 can control so that the substrates Da, Db are transferred to each of the bonding sections 40-1 and 40-2 after the holding transfer section 30, transfer section 50, and high-speed rotary stage 58-1, 58-2 are prepared for their operations. It is more preferable that at that time the setting section 60 is prepared for receiving the substrates from the high-speed rotary stage 58-1, 58-2. As a result, the thickness of the adhesive layer between the substrates can be surely made uniform in the continuous manufacturing production. Additionally, the controller 200 can control so that the substrates Da, Db with the unset adhesive g are not stopped on the setting section 60 before the substrates are passed through the ultraviolet projection section 62 in order to more securely attain the above effect.

Therefore, the controller 200 can perform the following control so as to smoothly and effectively manufacture the optical disks.

The substrate accumulating section 10 is driven when the alignment transfer section 20 is prepared for its operation.

The alignment transfer section 20 is driven when the substrate accumulating section 10 and holding transfer section 30 are prepared for their operations.

The holding transfer section 30 is driven when the alignment transfer section 20 and bonding sections 40-1, 40-2 are prepared for their operations.

The bonding section 40-1 is driven when the holding transfer section 30, transfer section 50, and high-speed rotary stage 58-1 are prepared for their operations.

The bonding section 40-2 is driven when the holding transfer section 30, transfer section 50, and high-speed rotary stage 58-2 are prepared for their operations.

The transfer section 50 is driven when the holding transfer section 30, bonding section 401, bonding section 40-2, and setting section 60 are prepared for their operations.

The high-speed rotary stage 58-1 is driven when the transfer section 50 is prepared for its operation.

The high-speed rotary stage 58-2 is driven when the transfer section 50 is prepared for its operation.

The setting section 60 is driven when the transfer section 50 and transfer arm 72 are prepared for their operations.

The ultraviolet projection section 62 is driven when the setting section 60 is prepared for its operation.

The transfer arm 72 is driven when the setting section 60 and horizontal conveyor 74 are prepared for their operations.

The horizontal conveyor 74 is driven when the transfer arm 72 and reciprocating transfer section 76 are prepared for their operations.

The reciprocating transfer section 76 is driven when the horizontal conveyor 74, inspecting section 70, defective product collecting section 78, and optical disk collecting section 80 are prepared for their operations.

The inspecting section 70 is driven when the reciprocating transfer section 76 is prepared for its operation.

The failure product collecting section 78 is driven when the reciprocating transfer section 76 is prepared for its operation.

The optical disk collecting section 80 is driven when the reciprocating transfer section 76 and defective product collecting section 78 are prepared for their operations.

According to the method and apparatus for manufacturing optical disks of the present invention, when an adhesive is supplied to bond a pair of substrates confronting each other via the respective bonding faces, the substrates are sent to the bonding position in the confronting state and therefore correctly and efficiently supplied. Since one substrate is reversed and faced toward the adjacent substrate after the substrates are aligned, the substrates can be surely held to face each other in a simple operation. Moreover, the overlapped substrates via the adhesive are fed to the setting process without being shifted or deformed, thereby improving shape accuracy of optical disks.

The entire disclosure of Japanese Patent Application No. 9-141958 filed on May 30, 1997, including specification, claims, drawings, and summary are incorporated herein by reference in its entirety.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for manufacturing optical disks by bonding each pair of substrates via an adhesive, which comprises processes of:

(a) aligning substrates to be paired in an alternating row of a plurality of paired substrates with respective bonding faces thereof facing in one direction;

(b) turning over one substrate of each pair of substrates adjacent to each other in the aligned row and holding the one and the other substrates of the pair with respective bonding faces facing each other;

(c) supplying the pair to a bonding position while holding the pair in a state facing each other;

(d) feeding an adhesive into an interval of the substrates held confronting each other at the bonding position, reducing the interval and spreading the adhesive in a radial direction while rotating the substrates around a center axis of the substrates, to thereby form an adhesive layer between the substrates;

(e) supporting from below a lower substrate of the pair of substrates confronting each other via the adhesive layer, and sending the substrates from the bonding position to a setting position;

(f) setting the adhesive layer at the setting position to unite the substrates in one body, thereby obtaining an optical disk; and (g) removing the optical disk from the setting position.

2. A method for manufacturing optical disks according to claim 1, wherein the process (a) includes processes of:

(a-1) sequentially piling and accumulating only substrates of the same kind among the pairs; and (a-2) alternately taking out the accumulated substrates and aligning them with respective bonding faces facing in said one direction.

3. A method for manufacturing optical disks according to claim 1, wherein, in the process (b), the one substrate is a leading substrate of the aligned row and the other substrate is a substrate next to the leading substrate of the aligned row.

4. A method for manufacturing optical disks according to claim 1, wherein the adhesive is fed annularly in the process (d).

5. A method for manufacturing optical disks according to claim 1, which further includes, between the processes (d) and (e), a process (d+) of rotating the substrates holding the adhesive layer therebetween in the planar direction to thereby adjust a thickness of the adhesive layer.

6. A method for manufacturing optical disks according to claim 1, which further includes, after the process (g), a process (h) of inspecting the optical disk.

7. An apparatus for manufacturing optical disks by bonding substrates in pairs via an adhesive, which comprises:

an alignment transfer device for aligning and transferring substrates to be paired with respective bonding faces facing in one direction;

a turn-over holding device which turns over one substrate of each pair of substrates adjacent to each other at the alignment transfer device and holds the one and the other substrates of the pair in a state with respective bonding faces facing each other;

a bonding device;

a substrate feed device for feeding the pair of substrates to said bonding device while holding the pair in the state facing each other;

the bonding device including a substrate holding device which holds the pair of substrates fed from the feed device in a state facing each other, can change an interval of the substrates and rotate the substrates in a planar direction, and an adhesive discharge device which can freely move toward and away from the interval of the substrates from beside the substrates held by the substrate holding device and discharge the adhesive;

a setting device a pre-setting transfer device which supports from below a lower substrate of the pair of substrates piled via the adhesive at the bonding device and transfers the pair from the bonding device to said setting device;

the setting device setting the adhesive between the substrates transferred by the transfer device to thereby obtain an optical disk of the united substrates; and a take-out device for removing the optical disk from the setting device.

8. An apparatus for manufacturing optical disks according to claim 7, which further comprises:

a pair of substrate accumulating devices where only substrates of the same kind among the pairs are sequentially accumulated via spacers with the bonding faces facing in the one direction;

a spacer collecting device for sequentially piling and collecting the spacers; and a turning transfer device having four transfer arms, which extend in four radial directions and which turn integrally, for holding the substrates and spacers, wherein the pair of substrate accumulating devices are disposed in two opposing directions of the four radial directions relative to a turning center of the transfer device, the spacer collecting device is disposed in another one of the four radial directions and the alignment transfer device is in the remaining one of the four radial directions, so that the turning transfer device alternately removes substrates from the paired substrate accumulating devices and sends the substrates to the alignment transfer device, and sends the spacers from between the paired substrates to the spacer collecting device.

9. An apparatus for manufacturing optical disks according to claim 7, wherein the substrate feed device has a transfer member reciprocating between the turnover holding device and the bonding device, and suction parts arranged at front and rear faces of an end of the transfer member for sucking and holding the substrates.

10. A method for manufacturing optical disks according to claim 1, which further includes a process for controlling, when the adhesive is present in the interval between substrates at each of the bonding sections, so as to prevent stoppage of transfer of the substrates with the adhesive before the adhesive is set.

11. An apparatus for manufacturing optical disks according to claim 7, which further includes a controller for controlling, when the adhesive is present in the interval between substrates at each of the bonding sections, so as to prevent stoppage of transfer of the substrates with the adhesive before the adhesive is set.

12. A method for manufacturing optical disks according to claim 2, wherein, in the process (b), the one substrate is a leading substrate of the aligned row and the other substrate is a substrate next to the leading substrate of the aligned row.

13. A method for manufacturing optical disks according to claim 2, wherein the adhesive is fed annularly in the process (d).

14. A method for manufacturing optical disks according to claim 3, wherein the adhesive is fed annularly in the process (d).

15. A method for manufacturing optical disks according to claim 2, which further includes, between the processes (d)

and (e), a process (d+) of rotating the substrates holding the adhesive layer therebetween in the (plane) planar direction to thereby adjust a thickness of the adhesive layer.

16. A method for manufacturing optical disks according to claim 3, which further includes, between the processes (d) and (e), a process (d+) of rotating the substrates holding the adhesive layer therebetween in the planar direction to thereby adjust a thickness of the adhesive layer.

17. A method for manufacturing optical disks according to claim 4, which further includes, between the processes (d) and (e), a process (d+) of rotating the substrates holding the adhesive layer therebetween in the planar direction to thereby adjust a thickness of the adhesive layer.

18. A method for manufacturing optical disks according to claim 2, which further includes, after the process (g), a process (h) of inspecting the optical disk.

19. A method for manufacturing optical disks according to claim 3, which further includes, after the process (g), a process (h) of inspecting the optical disk.

20. A method for manufacturing optical disks according to claim 4, which further includes, after the process (g), a process (h) of inspecting the optical disk.

21. A method for manufacturing optical disks according to claim 5, which further includes, after the process (g), a process (h) of inspecting the optical disk.

22. An apparatus for manufacturing optical disks according to claim 8, wherein the substrate feed device has a transfer member reciprocating between the turnover holding device and the bonding device, and suction parts arranged at front and rear faces of an end of the transfer member for sucking and holding the substrates.

23. A method for manufacturing optical disks according to claim 2, which further includes a process for controlling, when the adhesive is present in the interval between substrates at each of the bonding sections, so as to prevent stoppage of transfer of the substrates with the adhesive before the adhesive is set.

24. A method for manufacturing optical disks according to claim 3, which further includes a process for controlling, when the adhesive is present in the interval between substrates at each of the bonding sections, so as to prevent stoppage of transfer of the substrates with the adhesive before the adhesive is set.

25. A method for manufacturing optical disks according to claim 4, which further includes a process for controlling, when the adhesive is present in the interval between substrates at each of the bonding sections, so as to prevent stoppage of transfer of the substrates with the adhesive before the adhesive is set.

26. A method for manufacturing optical disks according to claim 5, which further includes a process for controlling, when the adhesive is present in the interval between substrates at each of the bonding sections, so as to prevent stoppage of transfer of the substrates with the adhesive before the adhesive is set.

27. A method for manufacturing optical disks according to claim 6, which further includes a process for controlling, when the adhesive is present in the interval between substrates at each of the bonding sections, so as to prevent stoppage of transfer of the substrates with the adhesive before the adhesive is set.

28. An apparatus for manufacturing optical disks according to claim 8, which further includes a controller for controlling, when the adhesive is present in the interval between substrates at each of the bonding sections, so as to prevent stoppage of transfer of the substrates with the adhesive before the adhesive is set.

29. An apparatus for manufacturing optical disks according to claim 9, which further includes a controller for controlling, when the adhesive is present in the interval between substrates at each of the bonding sections, so as to prevent stoppage of transfer of the substrates with the adhesive before the adhesive is set.

* * * * *